United States Patent
von Engelbrechten et al.

(10) Patent No.: US 6,886,833 B1
(45) Date of Patent: May 3, 2005

(54) SEAL FOR USE IN CONFINED SPACE AND METHOD

(75) Inventors: Arnold A. W. J. von Engelbrechten, Cleveland, OH (US); Ronald G. Claus, Medina, OH (US)

(73) Assignee: System Seals, Inc., Cleveland, OH (US)

( * ) Notice: Subject to any disclaimer, the term of this patent is extended or adjusted under 35 U.S.C. 154(b) by 0 days.

(21) Appl. No.: 10/298,318

(22) Filed: Nov. 18, 2002

(51) Int. Cl.$^7$ ................................................ F16J 15/32
(52) U.S. Cl. ........................................ 277/551; 277/572
(58) Field of Search ............................... 277/551, 565, 277/566, 567, 572, 568; 305/103–106

(56) References Cited

U.S. PATENT DOCUMENTS

| | | | | | |
|---|---|---|---|---|---|
| 2,509,436 | A | * | 5/1950 | Isenbarger | 277/562 |
| 3,028,203 | A | * | 4/1962 | Lund et al. | 384/485 |
| 3,447,819 | A | * | 6/1969 | Borsum et al. | 285/111 |
| 4,089,533 | A | * | 5/1978 | Knudson | 277/436 |
| 4,114,897 | A | * | 9/1978 | Bainard | 277/309 |
| 4,126,317 | A | * | 11/1978 | Bainard | 277/551 |
| 4,204,716 | A | * | 5/1980 | Baylor | 305/103 |
| 4,216,973 | A | * | 8/1980 | Kessinger, Jr. | 277/349 |
| 4,400,898 | A | * | 8/1983 | Christensen et al. | 37/444 |
| 4,526,377 | A | * | 7/1985 | Hale et al. | 277/370 |
| 4,669,737 | A | * | 6/1987 | Diffenderfer | 277/551 |
| 4,928,979 | A | * | 5/1990 | Nagasawa | 277/348 |
| 5,052,695 | A | * | 10/1991 | Curtis | 29/235 |
| 5,269,537 | A | * | 12/1993 | Kiesel | 277/554 |
| 5,342,065 | A | * | 8/1994 | Blanke | 277/389 |
| 5,482,296 | A | * | 1/1996 | Peppiatt et al. | 277/568 |
| 5,503,404 | A | * | 4/1996 | Newton et al. | 277/551 |
| 5,503,408 | A | * | 4/1996 | Hemann et al. | 277/565 |
| 6,145,846 | A | * | 11/2000 | Slack et al. | 277/550 |
| 6,485,256 | B1 | * | 11/2002 | Iketani | 415/113 |

* cited by examiner

*Primary Examiner*—Alison K. Pickard
(74) *Attorney, Agent, or Firm*—Fay, Sharpe, Fagan, Minnich & McKee, LLP

(57) ABSTRACT

A seal includes an annular hub and an annular sealing projecting outwardly from the hub. The sealing lip includes an inner portion located adjacent the hub and an outer portion spaced from the hub. The outer portion defines a nose. The seal includes a hinge portion formed as a one-piece construction with the hub and the sealing lip, and the hinge portion pivotably interconnects the sealing lip to the hub so that the sealing lip is selectively manually movable to and between: (i) an operative position, where the nose is located axially outward of the second axial end of the hub; and, (ii) a non-operative installation position, where the lip is located axially inward of the second axial end of the hub. The hinge portion biases the sealing lip away from the operative position when the sealing lip is moved to the non-operative position, and the hinge portion biases the sealing lip away from the non-operative position when the sealing lip is moved to the operative position. A method of installing the seal is disclosed.

6 Claims, 4 Drawing Sheets

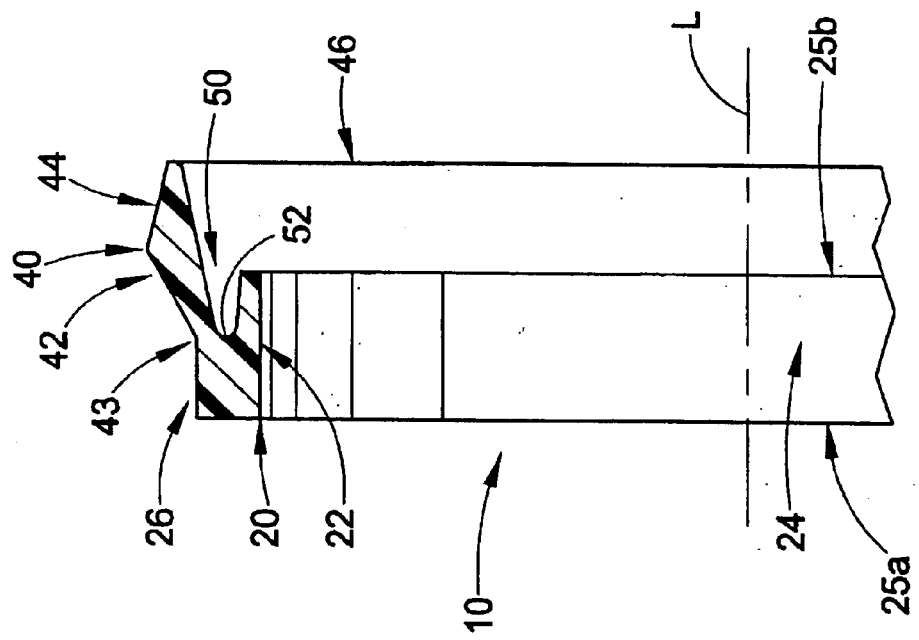
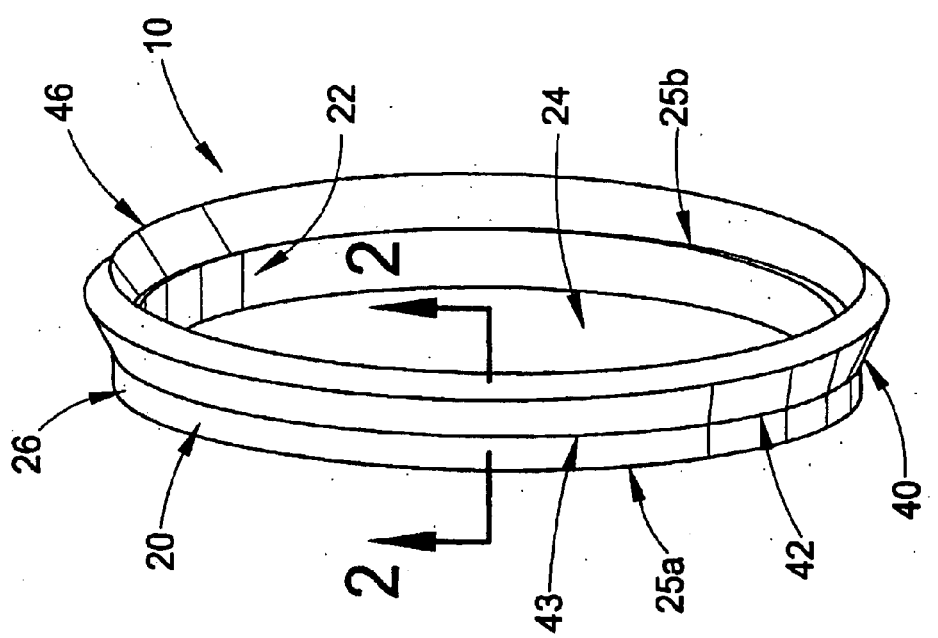

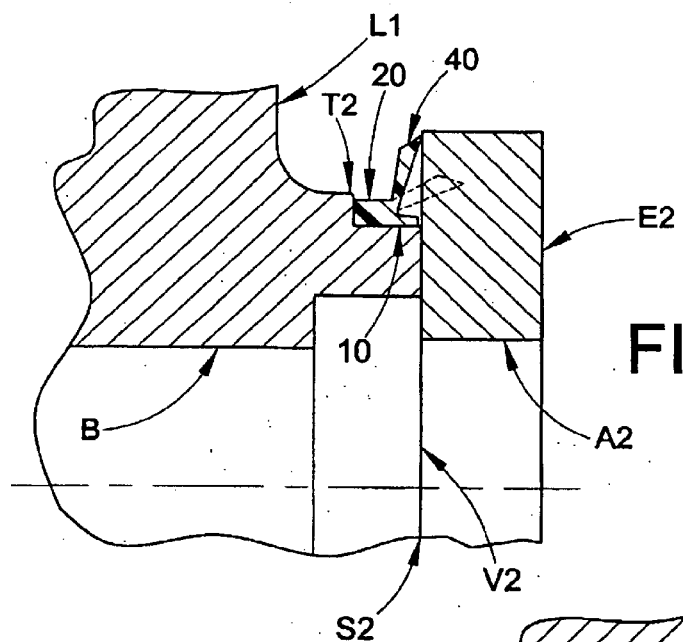
FIG. 5A
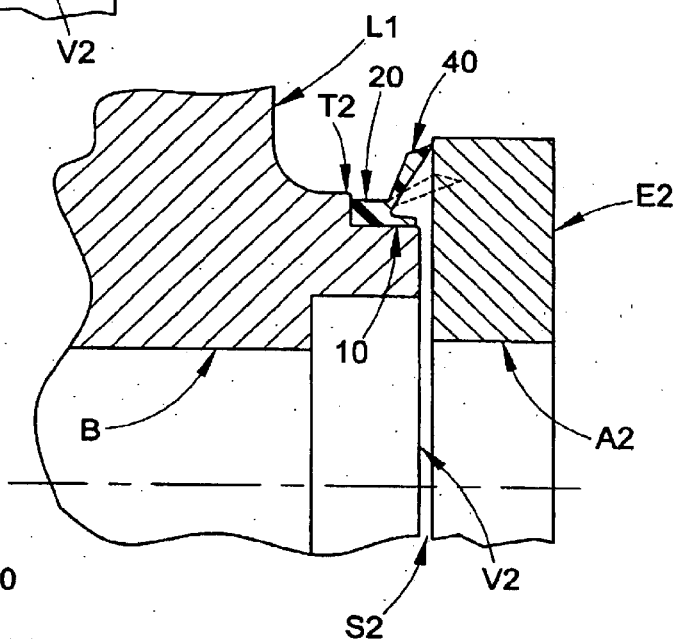
FIG. 5B
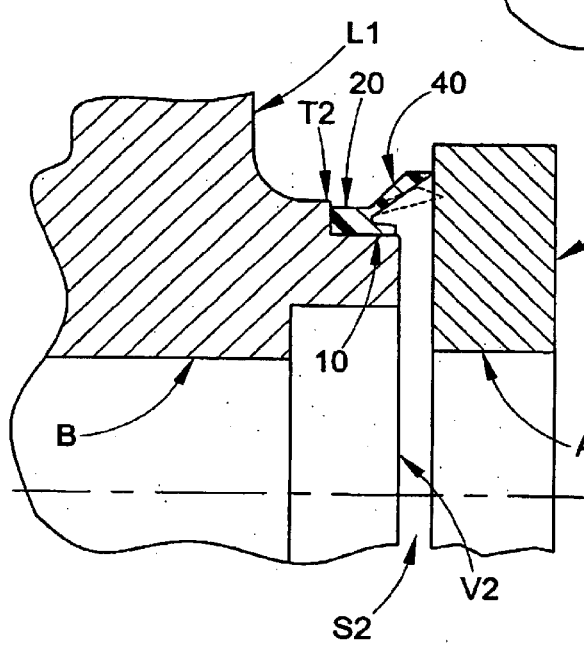
FIG. 5C

SEAL FOR USE IN CONFINED SPACE AND METHOD

BACKGROUND OF THE INVENTION

The present invention relates to seals and, more particularly, to a seal for use in a confined space and method of installing same. Preferred embodiments of the seal are described herein for use in connection with a link-pin of a skid-steer loader or other excavation apparatus, but it is not intended that the seal be limited to such an environment.

A common problem associated with seals is their installation into confined spaces that don't allow for easy access. Heretofore, seals for use in confined spaces have been deficient owing to their complexity and cost, ineffectiveness and/or time-consuming installation. Thus, a need has been identified for a novel and unobvious seal particularly adapted for use in confined spaces that is inexpensive, reliable and quick and easy to install.

SUMMARY OF THE INVENTION

In accordance with a first aspect of the present invention, a seal comprises an annular hub comprising an inner surface defining an opening adapted to receive a first associated member, wherein the hub extends axially between first and second axial ends. An annular sealing lip is formed as a one-piece construction with and projects outwardly from the hub. The sealing lip comprises an inner portion located adjacent the hub and an outer portion spaced from the hub. The outer portion of the sealing lip defines a nose. The seal further comprises a hinge portion formed as a one-piece construction with the hub and the sealing lip. The hinge portion pivotably interconnects the sealing lip to the hub, wherein the sealing lip is selectively manually movable to and between: (i) an operative position, where the nose of the sealing lip is located axially outward of the second axial end of the hub and is operatively positioned to engage a second associated member; and, (ii) a non-operative installation position, where the sealing lip is located axially inward of the second axial end of the hub. The sealing lip is self-supporting in the non-operative installation position.

In accordance with another aspect of the present invention, a linkage assembly comprises first and second pivotably interconnected link members, defining a space therebetween, and a one-piece seal operatively secured to the first link member adjacent the space. The one-piece seal comprises a hub defining first and second axial ends and comprising a cylindrical inner surface that defines an opening, wherein a portion of the first link member is closely received in the opening. The hub inhibiting movement of contaminants between the seal and the first link member. The seal further comprises a sealing lip comprising an inner portion and an outer portion, wherein the outer portion defines a nose. The seal further comprises a hinge portion located between the hub and the inner end of the sealing lip. The hinge portion movably interconnects the sealing lip to the hub wherein the sealing lip is manually movable between: (i) an operative position where the nose projects axially outward from the second axial end of the hub into the space and is adapted to engage the second link member sealingly to inhibit movement of contaminants between the sealing lip and the second link member; and, (ii) a non-operative position where the nose of the sealing lip is spaced from the second link member. The hinge portion biases the sealing lip away from the operative position when the sealing lip is moved to the non-operative position so that the sealing lip is self-supporting when moved to the non-operative position. In accordance with another aspect of the present invention, a method of installing a seal in a space defined between first and second pivotably interconnected link members includes positioning an annular hub of a seal on the first link member, with the hub sealingly engaging the first link member. An annular sealing lip of the seal is moved manually relative to the hub from an operative position, where a nose of the sealing lip projects axially away from a second axial edge of the hub in a first direction, to a non-operative position, where the nose of the sealing lip projects axially away from the second axial edge of said hub in a second direction that is generally opposite the first direction. The first and second link members are then pivotably interconnected so that a space is defined therebetween. The sealing lip of the seal is moved manually from the non-operative position to the operative position so that the nose of the sealing lip abuts the second link member when the sealing lip is moved to the operative position.

BRIEF DESCRIPTION OF DRAWINGS

The invention comprises various components and arrangements of components and comprises various steps and arrangements of steps, preferred embodiments of which are illustrated in the accompanying drawings that form a part hereof and wherein:

FIG. 1 is an isometric view of a seal formed in accordance with a first embodiment of the present invention;

FIG. 2 is a sectional view taken along line 2—2 of FIG. 1;

FIGS. 5A–5C are similar to FIG. 4C but show the first and second link members in first, second and third operative positions relative to each other to illustrate first, second and third operative positions of the seal, respectively.

DETAILED DESCRIPTION OF PREFERRED EMBODIMENTS

Figure 3:
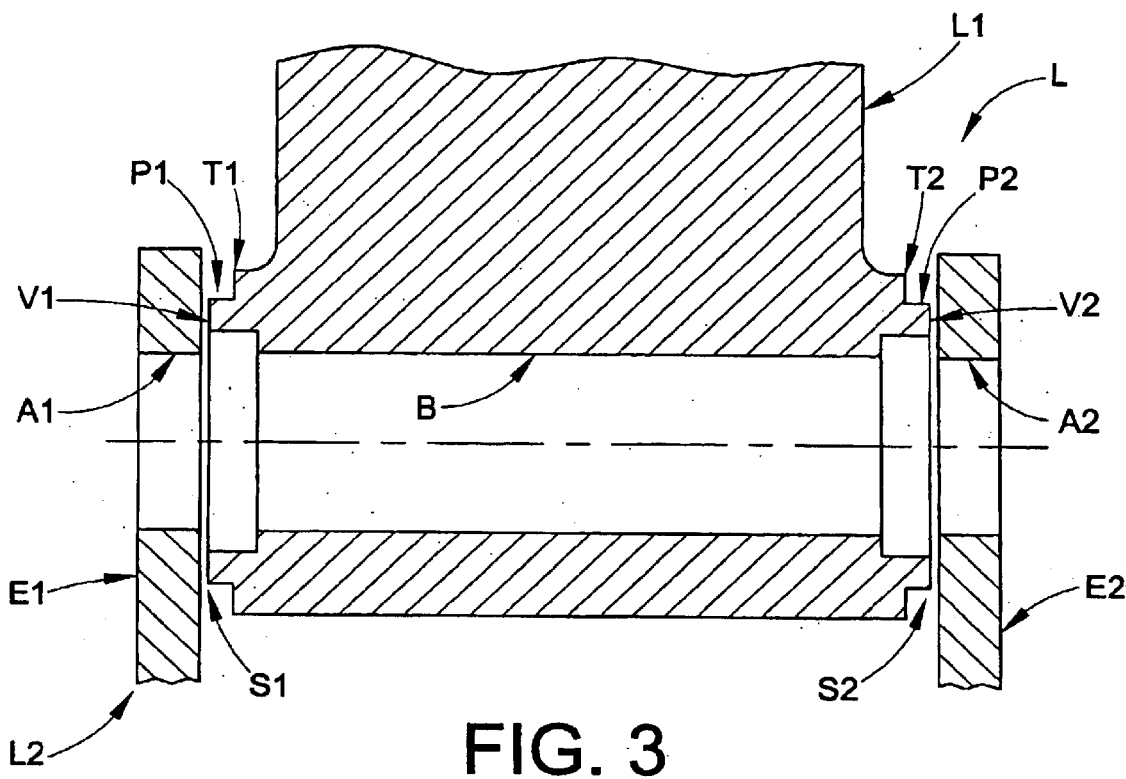
FIG. 3 is a sectional view of a link assembly (including first and second link members) of an excavation apparatus in connection with which the seal of FIG. 1 is usable.

Referring now to the drawings, which are for the purpose of illustrating preferred embodiments of the invention only and are not intended to limit the invention in any way, FIGS. 1 and 2 illustrate a seal 10 formed in accordance with the present invention. The seal 10 is preferably but not necessarily defined as a one-piece construction using any suitable elastomeric material such as, for example, a polyester-based elastomer such as thermoplastic polyurethane or any other suitable material. The seal 10 is molded, machined or otherwise manufactured.

The seal 10 comprises an annular hub portion 20 having a cylindrical inner surface 22 that defines a mounting opening 24. The cylindrical inner surface 22 is defined about a longitudinal axis L and the hub 20 comprises first and second opposite axial ends 25a,25b and an outer surface 26.

An annular sealing lip 40 is connected to and projects outwardly from the hub 20. More particularly, the sealing lip 40 comprises an inner portion 42 and an outer portion 44 that extends to a distal end or nose 46 that is axially-spaced outwardly from the second axial end 25b of the hub 20 when the sealing lip is in an operative position as described below and as shown in FIGS. 1 and 2. In the preferred embodiment, as illustrated in FIGS. 1 and 2, the nose 46 is also spaced radially outward from the inner portion 42 of the sealing lip 40, i.e., the sealing lip 40 diverges moving from the inner portion 42 toward the nose 46. The nose 46 can terminate in a sharp point or a flat surface (or any otherwise conformed surface) so that the nose is adapted to engage an associated member with the required sealing engagement as described herein. The seal 10 comprises a hinge portion 43 that pivotably interconnects the sealing lip 40 to the hub 20, preferably at a location axially between the first and second hub ends 25a,25b.

To facilitate pivoting movement of the sealing lip 40 relative to the hub 20 as required for effective sealing, the seal 10 defines a recess 50 located between the sealing lip 40 and the hub 20. Preferably, the recess 50 is defined between the sealing lip 40 and the second axial end 25b of the hub 20, with a closed, innermost end 52 of the recess 50 located between (about midway between) the axial ends 25a,25b of the hub 20. Also, in the illustrated embodiment, the hinge portion 43 has a reduced-thickness relative to the sealing lip 40 and the hub 20.

FIG. 3 is a sectional view of the link assembly L of the type in connection with which a seal 10 formed in accordance with the present invention is used. As noted above, the link assembly L (which can be part of a skid-steer loader or similar apparatus) is only one example of an application for the seal 10, and it is not intended that the present invention be limited to such an application.

The link assembly L comprises a first link member L1 and a second link member L2. At least one of the link members L1,L2 can be an attachment (e.g., a bucket or tool) connected to and controlled by the other link member. In the illustrated example, the second link member comprises first and second parallel, spaced-apart ears E1,E2 between which the first link member L1 is closely received. The ears E1,E2 define respective apertures A1,A2 that are aligned with each other. The first link member L1 defines a through-bore B, and the through-bore B is aligned or registered with the apertures A1,A2 when the first link member L1 is operatively positioned between the ears E1,E2. A pin (not shown) is inserted through the aligned apertures A1,A2 and bore B to pivotably interconnect the link members L1,L2 as is generally well known. The pin is axially secured with one or more pin-holders (not shown).

With continuing reference to FIG. 3, it can be seen that first and second spaces S1,S2 are defined or created between the opposite lateral ends V1,V2 of the first link member L1 and the ears E1,E2, respectively. The spaces provide undesirable channels or paths through which dirt, water and other contaminants can enter the bore B and/or apertures A1,A2 and through which lubrication can escape these areas. A seal 10 formed in accordance with the present invention is operatively located in each of these spaces S1,S2 to inhibit entry of contaminants and escape of lubrication.

The first link member L1 defines first and second reduced-diameter portions P1,P2 on the opposite lateral ends V1,V2 thereof. Respective first and second shoulders T1,T2 are defined between the reduced-diameter portions P1,P2 and the remaining portions of the link member L1.

Figure 4A:
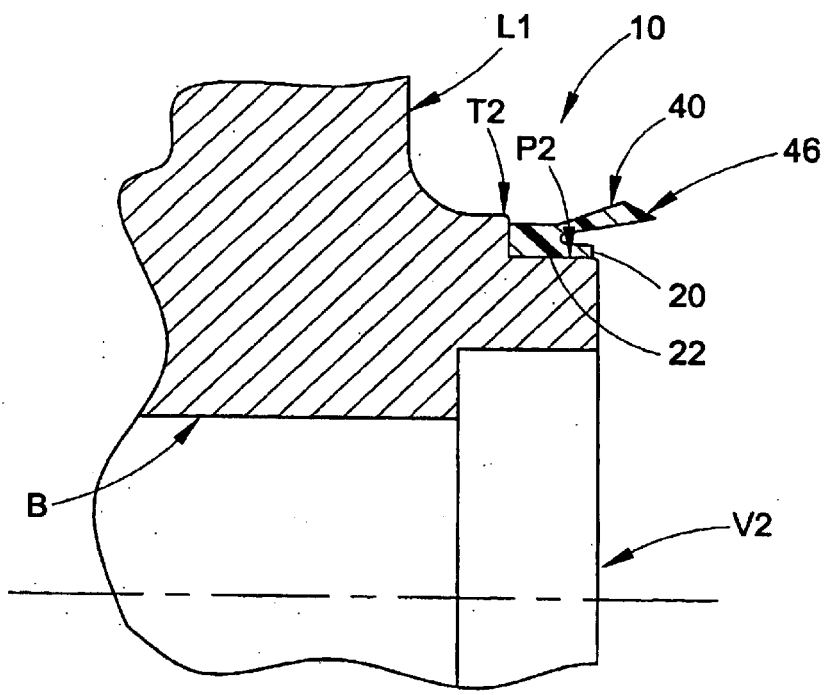
FIG. 4A is an enlarged, partial view of the first link member of the link assembly shown in FIG. 3 and showing the seal of FIGS. 1 and 2 connected thereto, with the seal in a free state.
Figure 4B:
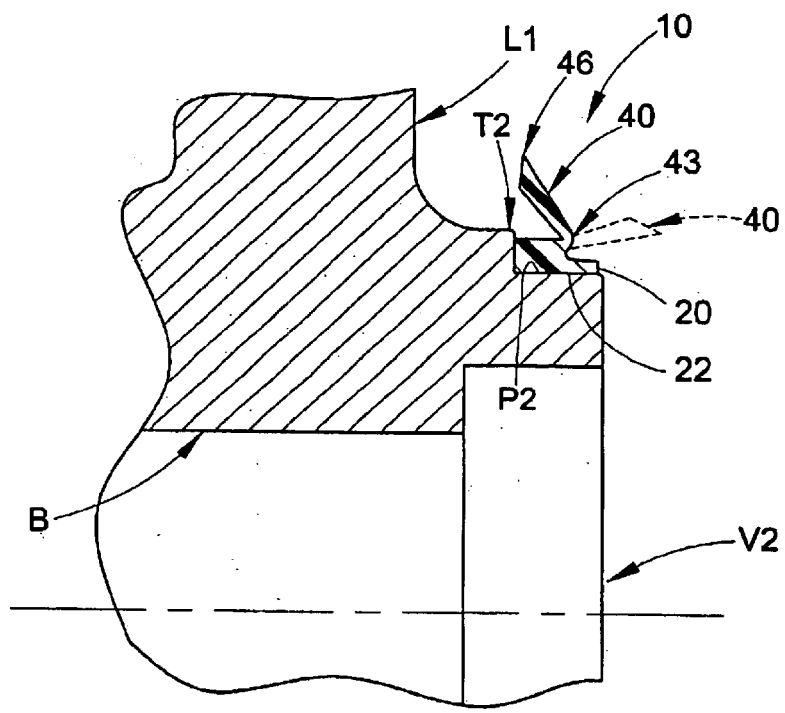
FIG. 4B is identical to FIG. 4A, but shows the seal in a non-operative (or installation) position (the free state is shown in phantom)
Figure 4C:
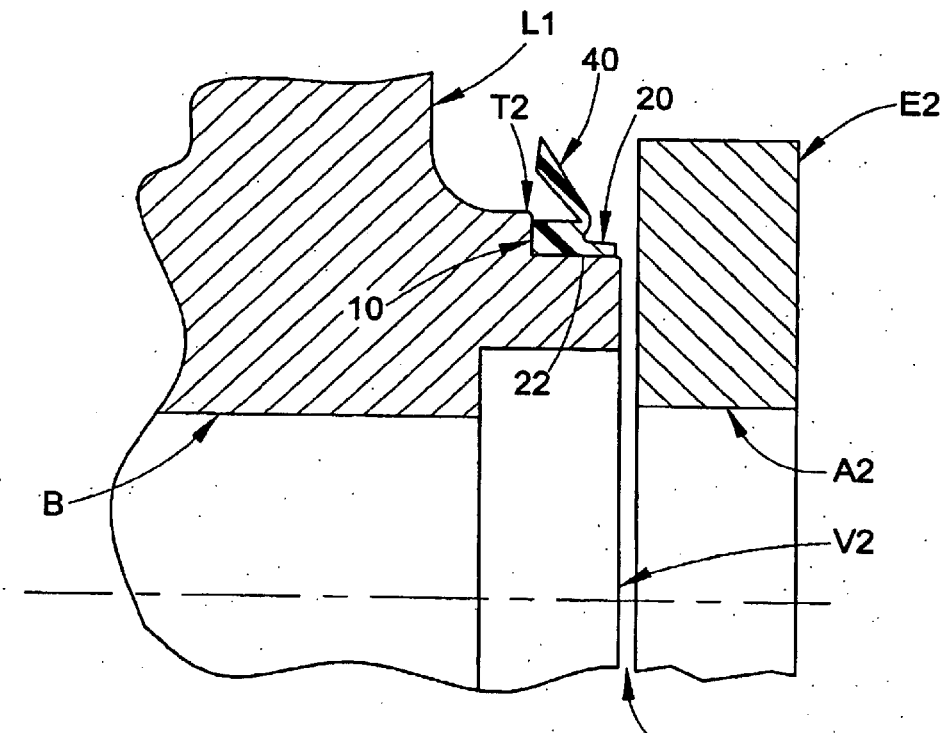
FIG. 4C is similar to FIG. 4B but partially shows both the first and second link members with the seal in the non-operative (installation) position.

With reference now to FIGS. 4A–4C, the first link member L1 is partially shown with a seal 10 connected thereto. Although FIGS. 4A–4C only show the seal 10 connected to the reduced-diameter portion P2, those of ordinary skill in the art will recognize that a seal 10 connects to the portion P1 in a corresponding, mirror-image arrangement.

FIG. 4A shows the seal 10 piloted on the reduced-diameter portion P2 with the reduced-diameter portion P2 closely received in the bore 24 so that the seal 10 is preferably non-rotatably positioned on the reduced-diameter portion P2 with a friction fit and so that the hub 20 of the seal 10 abuts the shoulder T2. A fluid-tight seal is thus established between the hub 20 and the link member L1. Also, the hub 20 and reduced-diameter portion P2 are approximately axially co-extensive.

With specific reference to FIG. 4A, it can be seen that when the hub 20 is piloted on the reduced-diameter portion P2 as described, the nose 46 of the sealing lip 40, when in the "free" or relaxed operative state, projects axially outward from and beyond the lateral end V2 of the link member L1 and axially outward from and beyond the second axial end 25b of the hub 20. With reference now to FIG. 4B, it can be seen that the sealing lip 40 is selectively movable from the free operative position (shown in phantom) to a non-operative or installation position where the sealing lip 40 is folded back upon the hub 20, i.e., to a position where the nose 46 is moved axially inward relative to the lateral edge V2 of the link member L1 and relative to the second axial end 25b of the hub 20. When the sealing lip 40 is moved to the non-operative installation position as shown in FIG. 4B, it remains in that position until manually moved to an operative position as shown in FIGS. 5A–5C and as described in further detail below. It should be noted that when the sealing lip 40 is moved to the non-operative installation position, the nose 46 is considered to be located axially inward of the second axial end 25b of the hub 20 when the nose 46 is located axially even with or between the first and second hub ends 25a,25b and/or when the nose 46 projects away from the second axial hub end 25b outwardly beyond the first axial hub end 25a as shown in FIG. 4B, i.e., the nose 46 is located axially inward of the second hub end 25b any time it is not located axially outward of the second hub end 25b. It is preferred that the sealing lip 40 be pivoted through at least 90 degrees and most preferably at least 135 degrees from the free operative position (shown in phantom in FIG. 4B) to the non-operative position (shown in solid lines in FIG. 4B).

The sealing lip 40 of the seal 10 is movable into the non-operative position (FIG. 4B) and remains in the non-operative position until manually moved because of the resilient nature of the material from which the seal 10 is defined and owing to the relationship between the hinge region 43 and the recess 50. More particularly, the hinge portion 43 is defined as part of the sealing lip 40, but is located as close a possible to the closed inner end 52 of the recess 50. Thus, when the sealing lip 40 is positioned in the non-operative position, the recess 50 is completely opened, except for the region immediately adjacent the closed inner end 52. Once the sealing lip 40 is pivoted sufficiently away from its the free operative position to overcome the resilient biasing force urging it toward the free operative position, the biasing force actually exerts a force on the sealing lip 40 in the opposite direction, i.e., away from the free position, to maintain the sealing lip 40 in the non-operative installation position. Thus, it can be said that the sealing lip 40 is self-supporting in the non-operative position because no external force need be exerted thereon to hold the sealing lip 40 in the non-operative position—instead, the hinge portion 43 holds the sealing lip 40 in the non-operative position once the sealing lip 40 is moved to the non-operative position. Of course, the sealing lip 40 is also self-supporting in its free operative position and is resistant to movement toward its non-operative position.

As shown in FIG. 4C, when the sealing lip 40 of the seal 10 is positioned in the non-operative installation position, no portion of the seal 10 interferes with or contacts the adjacent ear E1 when the first link member L1 is received between the ears E1,E2. Of course, when the seals 10 are installed on both reduced-diameter portions P1,P2, the sealing lips 40 of both these seals 10 are moved to the non-operative installation position as shown in FIGS. 4B,4C so that the link member L1, with both seals 10 connected thereto, is freely insertable between the ears E1,E2 to allow the associated pin to be inserted through the aligned apertures A1,A2 and bore B to pivotably interconnect the link member L1,L2. After the link members L1,L2 are pivotably interconnected, the sealing lips 40 are manually moved (using a blade or the like) to an operative position as shown in FIGS. 5A–5C.

FIGS. 5A–5C respectively show the sealing lip 40 in first, second and third operative positions as used to seal the space S1 defined between the second lateral side V2 of the first link member L1 and the ear E2. Because the first link member L1 can moved laterally between the ears E1,E2, the seal 10 must accommodate variations in the width of the spaces S1,S2. By way of example, FIG. 5A illustrates the link member L1 contacting the ear E2 so that the space S2 is nominally closed, FIG. 5C illustrates a maximum spacing S2, while FIG. 5B illustrates a spacing S2 between these two extremes. In all of FIGS. 5A–5C, the free or relaxed position of the sealing lip 40 is shown in phantom lines, and it is noted that the free position is considered to be an operative position as defined herein. Thus, those of ordinary skill in the art will recognize that the sealing lip 40 is resiliently movable to and between the first, second and third operative positions and, in all of these positions, the nose 46 of the sealing lip 40 is resiliently urged into sealing engagement with the ear E2. Also, even in the first operative position as shown in FIG. 5A, the sealing lip 40 is not pivoted sufficiently away from the free position to move into the non-operative installation position, i.e., when the sealing lip 40 is in its first operative position, it is still resiliently biased toward the free position and will not move into the non-operative installation position without manual movement to that position. It is preferred that the sealing lip 40 be dimensioned so that even when the space S2 is at a maximum, the nose 46 is never spaced from the ear E2 and the sealing lip 40 is not allowed to pivot completely into the free position. In one preferred embodiment, the sealing lip 40 pivots through an angle of at least 40 degrees and preferably about 50 degrees between the first (FIG. 5A) and third (FIG. 5C) operative positions.

To operatively install seals 10 in both spaces S1,S2 of a linkage assembly, such as the linkage L shown in FIG. 3, a seal 10 is connected to each of the reduced-diameter portions P1,P2 of the first linkage member L1 as described above. More particularly, the reduced-diameter portion P1,P2 is inserted into the opening 24 of each hub 20 and the hub 20 is moved completely onto the reduced-diameter portion P1,P2 until the hub 20 abuts the respective shoulder T1,T2. The sealing lip 40 of each seal is then moved manually into the non-operative installation position as shown in FIG. 4B. As disclosed above, owing to the resilient nature of the sealing lip 40 and the construction of the hinge portion 43, the sealing lip 40 remains in the non-operative installation position until it is moved manually to an operative position. With a seal 10 connected to each reduced-diameter portion P1,P2 and the sealing lips 40 of both seals 10 moved to the non-operative installation position, the first link member L1 (and seals 10 connected thereto) is positioned between the ears E1,E2 of the second link member L2 and the associated pin is inserted through the aligned apertures A1,A2 and bore B as described above to pivotably interconnected the link members L1,L2. After the members L1,L2 are pivotably interconnected, the sealing lips 40 of both seals 10 are manually moved into operative positions whereby the noses 46 thereof are moved into sealing abutment with the ears E1,E2, respectively.

The invention has been described with reference to preferred embodiments. Modifications and alterations will occur to those of ordinary skill in the art to which the invention pertains, and it is intended that the invention be construed as including all such modifications and alterations.

Having thus described the preferred embodiments, what is claimed is:

1. A seal comprising:

an annular hub comprising an inner surface defining an opening adapted to receive a first associated member, said hub extending axially between first and second axial ends;

a diverging annular sealing lip formed as a one-piece construction with and projecting radially and axially outward outwardly from said hub, said sealing lip comprising an inner portion located adjacent said hub and an outer portion spaced from said hub, said outer portion defining a nose; and, a hinge portion formed as a one-piece construction with said hub and said sealing lip, said hinge portion pivotably interconnecting said sealing lip to said hub between said first and second axial ends of said hub, wherein said sealing lip is selectively manually movable to and between:

(i) an operative position, where said nose of said sealing lip is located axially outward of said second axial end of said hub and is operatively positioned to engage a second associated member; and, (ii) a non-operative installation position, where said entire sealing lip extending from said hinge outwardly to and including said nose is located axially inward of said second axial end of said hub;

wherein said sealing lip is self-supporting in said non-operative installation position.

2. The seal as set forth in claim 1, wherein said sealing lip and said hub second axial end of said hub define a recess therebetween when said sealing lip is moved to said operative position, said recess defining an opening adjacent said second axial end of said hub and defining a closed inner end located axially between said first and second axial ends of said hub.

3. The seal as set forth in claim 2, wherein said hinge portion is located adjacent said closed inner end of said recess.

4. The seal as set forth in claim 2, wherein said sealing lip is movable to and between multiple operative positions, said nose of said sealing lip moving radially outward and inward when said sealing lip is moved from a free operative position, where said sealing lip is in a relaxed unbiased state, toward said non-operative installation position.

5. The seal as set forth in claim 4, wherein said sealing lip pivots through an arc of at least 40 degrees between two of said multiple operative positions.

6. The seal as set forth in claim 1, wherein said seal is defined as a one-piece construction from a polyester-based elastomer.

* * * * *